United States Patent [19]

Takimoto

[11] Patent Number: 4,667,760
[45] Date of Patent: May 26, 1987

[54] DISK BRAKE ARRANGEMENT FOR VEHICLE

[75] Inventor: Hiroshi Takimoto, Kami, Japan

[73] Assignee: Yamaha Hatsudoki Kabushiki Kaisha, Iwata, Japan

[21] Appl. No.: 733,642

[22] Filed: May 13, 1985

[30] Foreign Application Priority Data

May 21, 1984 [JP] Japan .................................. 59-102046
May 25, 1984 [JP] Japan .................................. 59-106097

[51] Int. Cl.⁴ ...................... B62D 61/08; F16D 65/04; F16D 65/847; F16D 65/853
[52] U.S. Cl. .................................. 180/215; 180/73.1; 188/71.6; 188/73.32
[58] Field of Search ...................... 180/215, 226, 73.1; 188/264 A, 264 AA, 71.6, 73.32, 73.33

[56] References Cited

U.S. PATENT DOCUMENTS

| | | | |
|---|---|---|---|
| 2,549,217 | 4/1951 | Mason | 188/264 A |
| 2,816,631 | 12/1957 | Butler | 188/264 A |
| 3,042,152 | 7/1962 | Butler | 188/73.32 |
| 3,110,365 | 11/1963 | Butler | 188/73.32 |
| 3,366,203 | 1/1968 | Dean | 188/264 A |
| 3,378,117 | 4/1968 | Stacy | 188/264 A |
| 4,346,792 | 8/1982 | Watanabe | 188/73.32 |
| 4,540,061 | 9/1985 | Watanabe | 180/215 |

FOREIGN PATENT DOCUMENTS

| | | | |
|---|---|---|---|
| 372167 | 6/1939 | Italy | 188/18 A |
| 136563 | 8/1983 | Japan | 180/215 |

*Primary Examiner*—John J. Love
*Assistant Examiner*—Everett G. Diederiks, Jr.
*Attorney, Agent, or Firm*—Ernest A. Beutler

[57] ABSTRACT

Several embodiments of improved braking arrangement for off the road, single rider, multiple wheeled vehicles. In each arrangement, a shaft drive is incorporated and a brake rotor is fixed for rotation with the shaft drive. A brake casing encircles the brake rotor and has at least one opening that is aligned with the rotor surface and in which a brake pad is supported by a cover that closes the opening and which is adapted to brake the rotor. In some embodiments, the brake pad is actuated mechanically and in others, it is actuated hydraulically. In some embodiments, the interior of the brake casing is vented to the air cleaner of the engine and in others, the casing is provided with pie-shaped cutouts for cooling.

9 Claims, 15 Drawing Figures

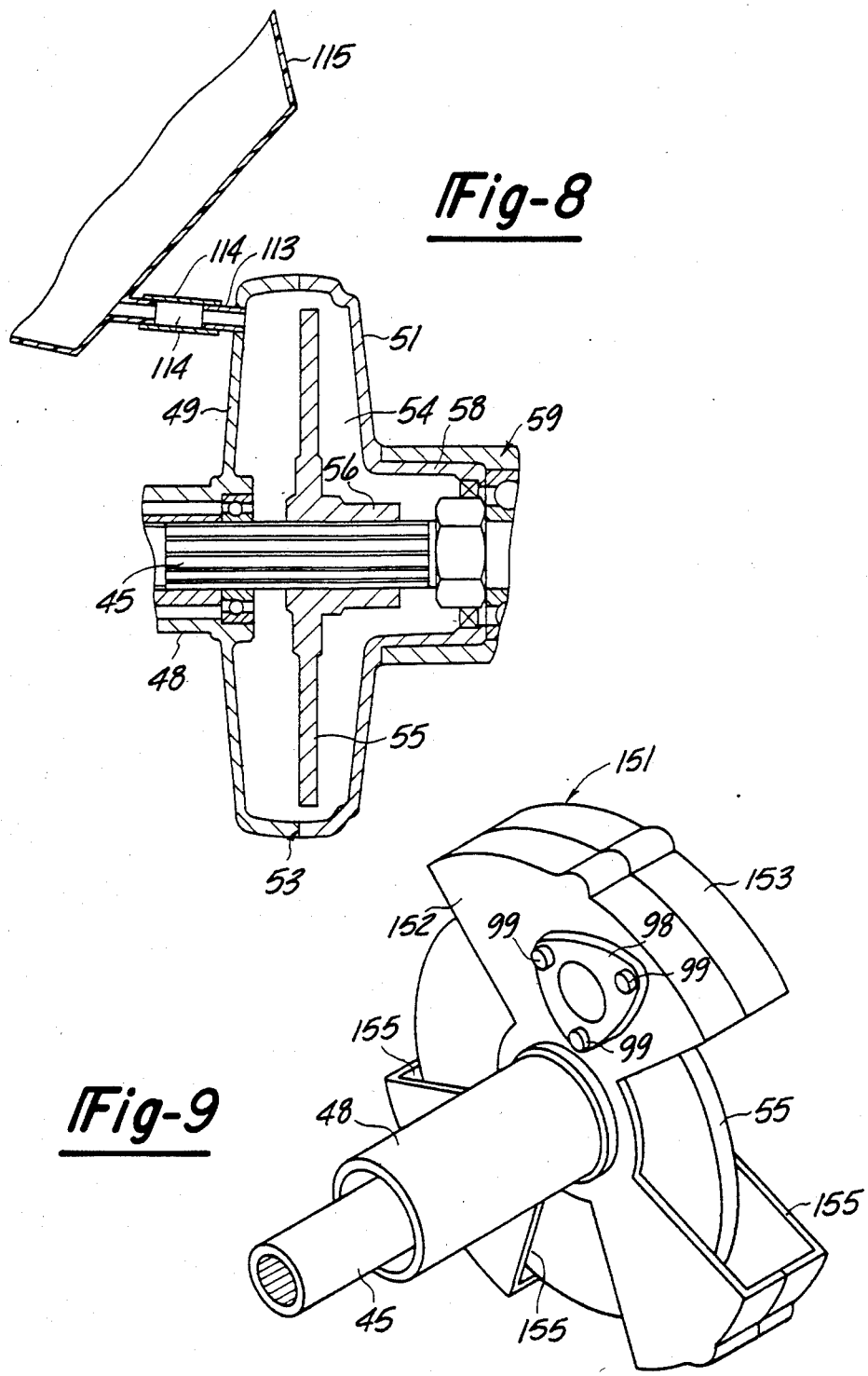

DISK BRAKE ARRANGEMENT FOR VEHICLE

BACKGROUND OF THE INVENTION

This invention relates to a disk brake arrangement for vehicles and more particularly to an improved disk brake assembly particularly adapted for use with off the road vehicles.

As is well known, disk brakes have a number of advantages with respect to braking capability over drum type brakes. One disadvantage with the disk type brake is that the rotor and brake actuating elements are relatively unprotected, unlike the conventional drum type brake wherein these components are contained internally within the brake drum and backing plate. The exposed mounting of the brake rotor, brake pads and brake actuating element has tended to limit the application of this type of brake, particularly when used with off the road type vehicles that operate in hostile or dirty environments. Although it may appear that the problems can be resolved by merely enclosing the disk type brake, such total enclosures can present a number of problems when it comes time to service the brake such as during replacement of the brake pads.

It is, therefore, a principal object of this invention to provide an improved disk brake assembly.

It is a yet further object of this invention to provide a disk brake assembly that is easy to service and yet can be operated in adverse environmental conditions.

Recently, there has been a large demand for off the road three and four wheeled vehicles that are designed primarily to accommodate a single rider. These vehicles employ large, low pressure balloon type tires that permit them to travel over a wide variety of terrains and are intended to be ridden primarily by a single rider. Because of this, the vehicles are extremely compact in nature and the placement of all of the necessary drive and braking components give rise to certain problems. For example, an arrangement should be provided for effectively braking at least the rear wheels of the vehicle. Disk type brakes are very desirable for such applications due to their effectiveness and compact nature. However, due to the off the road type of use for which these vehicles are designed, the braking system must be robust and should be located and protected so that it cannot be damaged if obstructions come into contact with the brake assembly. Because of the aforenoted defects with respect to the exposed nature of disk brakes, their application to off.the road vehicles has been limited.

It is, therefore, a principal object of this invention to provide an improved and simplified disk braking arrangement for such a vehicle.

It is another object of this invention to provide a disk brake for an off the road vehicle wherein the brake is protected and yet may be readily serviced.

SUMMARY OF THE INVENTION

A first feature of this invention is adapted to be embodied in a disk brake assembly having a shaft, a rotor that is fixed for rotation with the shaft, a casing that encircles the brake rotor and which has an opening formed therein that is aligned with a surface of the brake rotor and a cover affixed to the casing and closing the opening. Brake pad means are aligned with the cover and are adapted to engage the brake rotor for braking the brake rotor.

A second feature of this invention is adapted to be embodied in a drive and braking arrangement for a wheeled vehicle having a pair of spaced apart wheels, axle means carrying the wheels, final drive means associated with the axle means for driving the wheels, an engine and a drive shaft driven by the engine and associated with the final drive means for driving the wheels. A brake rotor is fixed for rotation with the drive shaft and a casing fixed relative to either the engine or the final drive means encircles the brake rotor and has an opening aligned with the surface of the brake rotor casing opening, a cover encloses this opening, and a brake pad is associated with the cover.

BRIEF DESCRIPTION OF THE DRAWINGS

FIG. 8 is a cross-sectional view, in part similar to FIG. 4, showing a manner in which the interior of the disk brake casing may be ventilated.

FIG. 9 is a perspective view of a disk brake casing constructed in accordance with another embodiment of the invention.

DETAILED DESCRIPTION OF THE PREFERRED EMBODIMENTS

Embodiment Of FIGS. 1 Through 8

Figure 1:
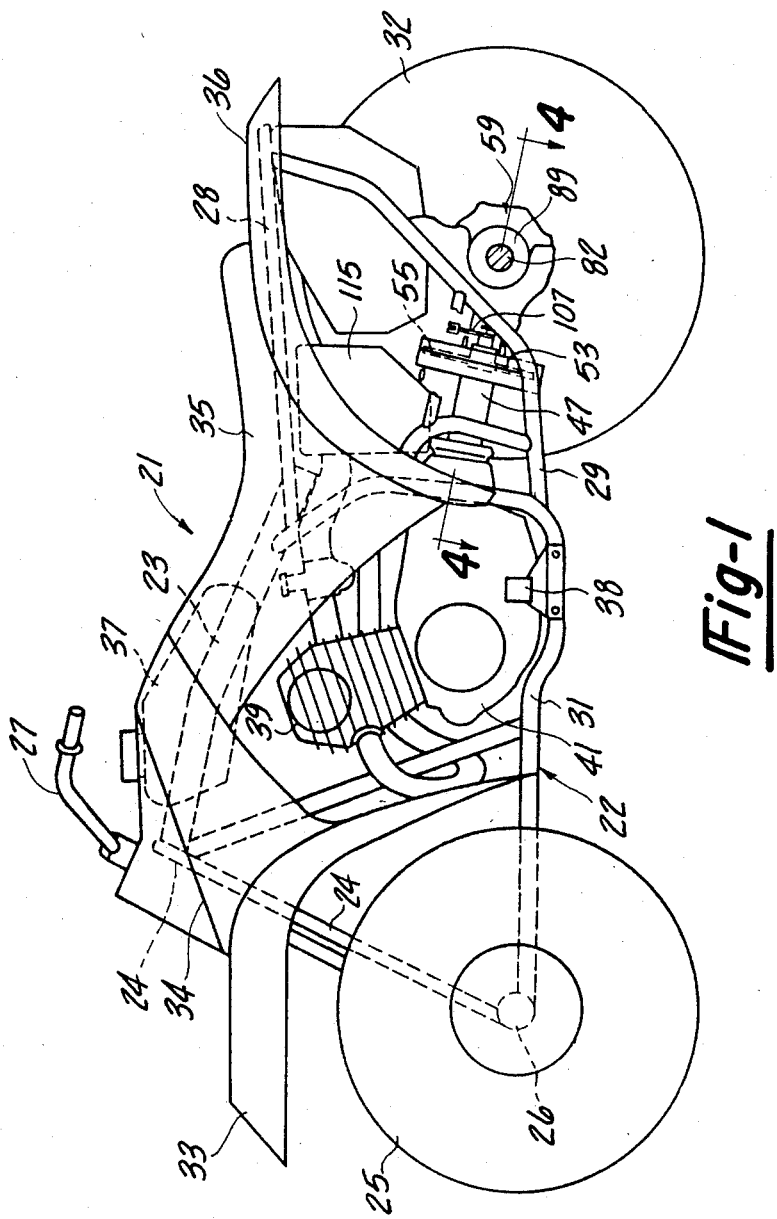
FIG. 1 is a side elevational view, with a portion broken away, of an off the road, four wheeled vehicle constructed in accordance with a first embodiment of the invention.
Figure 2:
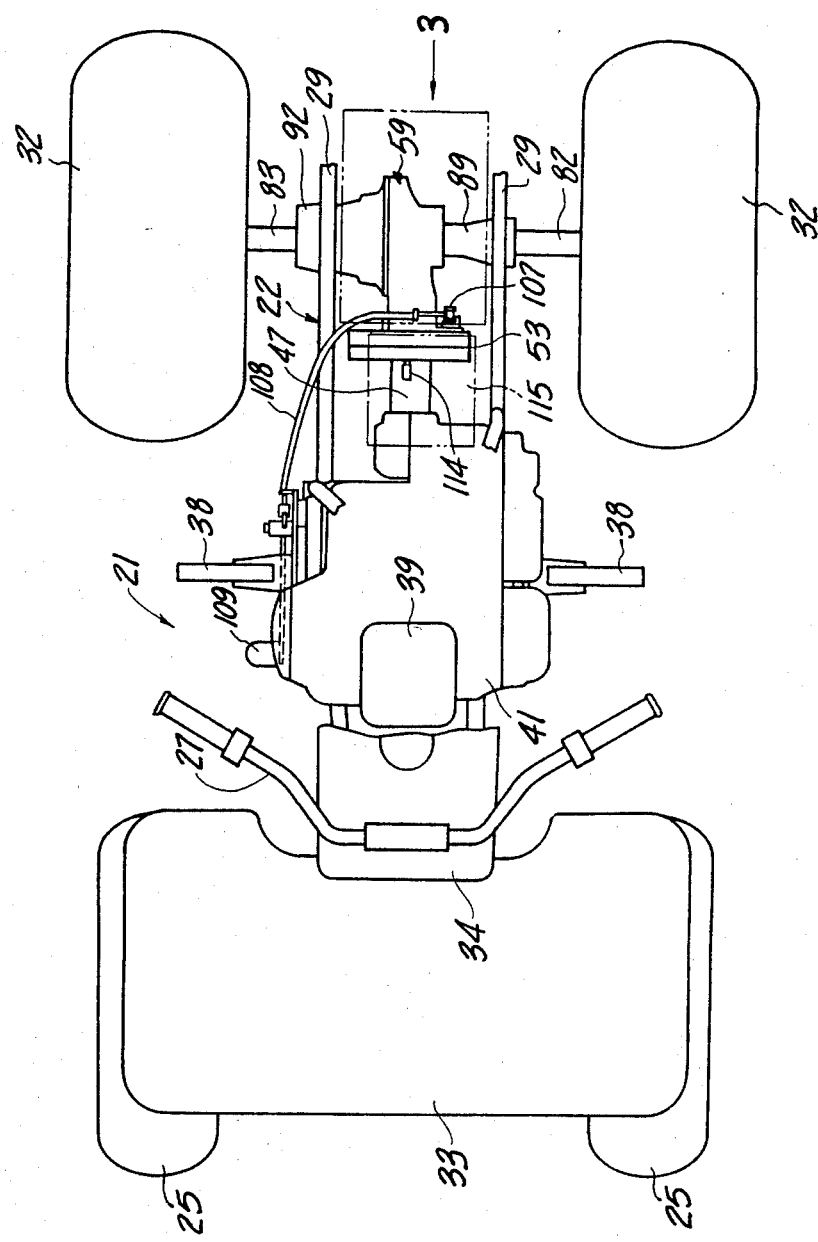
FIG. 2 is a top plan view of the vehicle shown in FIG. 1, with a portion of the body and seat removed so as to more clearly show the construction.
Figure 3:
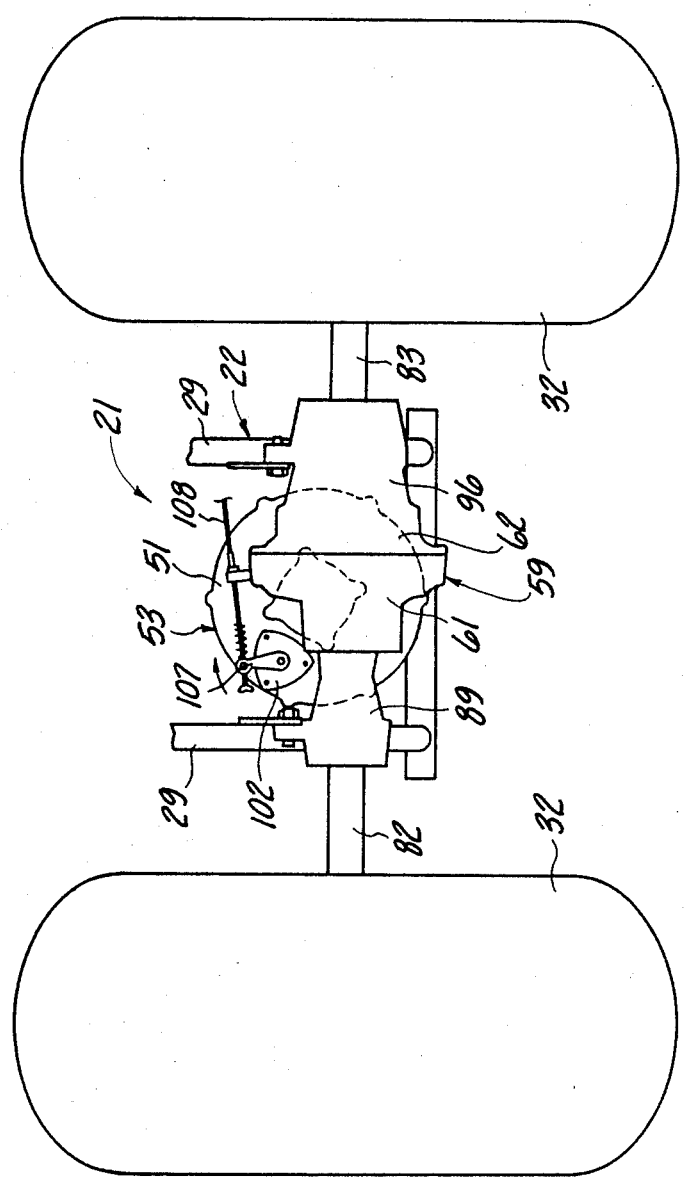
FIG. 3 is a rear elevational view looking generally in the direction of the arrow 3 in FIG. 2.

Referring first primarily to FIGS. 1 through 3, an off the road vehicle constructed in accordance with an embodiment of the invention is identified generally by the reference numeral 21. In the illustrated embodiment, as will become apparent, the vehicle 21 is of the four wheel type. It is to be understood, however, that the braking arrangement, which forms the substance of the invention, is particularly adapted for use with either four or three wheeled vehicles that are designed primarily to accommodate a single rider.

The vehicle 21 includes a frame assembly 22 which may be of any known type and, in the illustrated embodiment, is of the welded up tubular type including a main tube 23 that extends generally horizontally and rearwardly from a head tube 24. A pair of front wheels carrying low pressure, balloon tires 25 are supported for rotation by an axle 26 at the lower end of the head tube 24 as well as for steering movement. The front wheels 25 are steered by means of a handlebar assembly 27 which is journaled at the upper end of the head tube 24 and which is coupled for steering movement to the wheels 25 in any known manner.

A pair of seat rails 28 extend rearwardly from the main tube 23 in transversely spaced apart relationship. The rear ends of the seat rails 28 are supported at the upper end of seat pillar rails 29 that extend downwardly and horizontally where they are joined to transversely spaced apart down tubes 31 of the frame assembly 22. A pair of rear wheels carrying low pressure, balloon tires 32 are supported at the rear end of the frame assembly 22 in a manner to be described.

A body assemblage is contained on the frame 22 and is comprised of a front fender 33 that overlies at least, in part, the front wheels 25 and which is connected to a forward cowling portion 34. A seat 35 is carried by the frame assembly 22 over the rear portion of the main tube 23 and by the seat rails 28. The seat 35 is adapted and sized so as to handle primarily a single rider and is positioned centrally of the frame 22, above and forwardly of the rear wheels 32. A rear fender assembly 36 is positioned rearwardly of the seat 35 and beneath it and covers the forward and upper portion of the rear wheels 32. A fuel tank 37 is also carried by the frame assembly and specifically by the main tube 23 rearwardly of the head tube 24.

A pair of spaced apart foot pegs 38 are carried by the down tubes 31 and are positioned so as to accommodate the feet of a rider seated on the seat 35 in a comfortable position.

Referring now additionally to the remaining figures, the means for powering the vehicle 21 will be described. This includes an internal combustion engine, indicated generally by the reference numeral 39 that is supported by the frame assembly 21 beneath the fuel tank 37 and seat 35. The engine 39 may be of any known type and preferably is of the motorcycle type that includes a combined change speed transmission, crankcase assembly 41 so that the engine 39 output shaft drives the output of the transmission at any of a plurality of speed ratios.

An output shaft 42 of the transmission 41 (FIG. 4) carries a bevel gear 43 that is in mesh with a driven bever gear 44 that is coupled for rotation with the forward end of a drive shaft 45 by means of an overload release coupling 46. The forward end of the drive shaft 45 is contained within a protective housing 47 of a generally cylindrical or tubular configuration that is affixed at its forward end in any suitable manner to the rear end of the crankcase transmission assembly 41 of the engine 39.

The protective housing 47 is comprised of a first, forward tubular part 48 of a diameter that is only slightly larger than the diameter of the drive shaft 45 and which terminates in a rearwardly extending enlarged flange portion 49. The flange portion 49 is affixed to a similarly shaped cup shape member 51 by means of bolts or screws 52 so as to provide a protective casing, indicated generally by the reference numeral 53.

The protective casing 53 defines an internal cavity 54 in which a brake rotor or disk 55 is journaled. The rotor or disk 55 has an internally splined hub portion 56 that is slidably engaged on splines 57 formed on an intermediate portion of the drive shaft 45 for rotatably coupling the disk 55 to the drive shaft 45 while permitting its axial movement relative thereto. The disk 55 is adapted to be braked for halting the vehicle 21 in a manner as will be described.

The cup shaped member 51 has a cylindrical pilot portion 58 that is received within a complementary opening formed by a final drive housing assembly, indicated generally by the reference numeral 59. The housing assembly 59 is made up of first and second parts 61 and 62 that are split along the longitudinal center line of the vehicle 21 and are held together by means including fasteners 63. This housing assembly 59 defines an internal cavity 64 into which a pinion gear 65 formed on the rear end of the drive shaft 45 extends. The casing 53 is affixed to the final drive casing 59 by means of a plurality of threaded fasteners 66 that extend into tapped openings formed in an outwardly extending flange 67 of the final drive housing piece 61.

Figure 6:
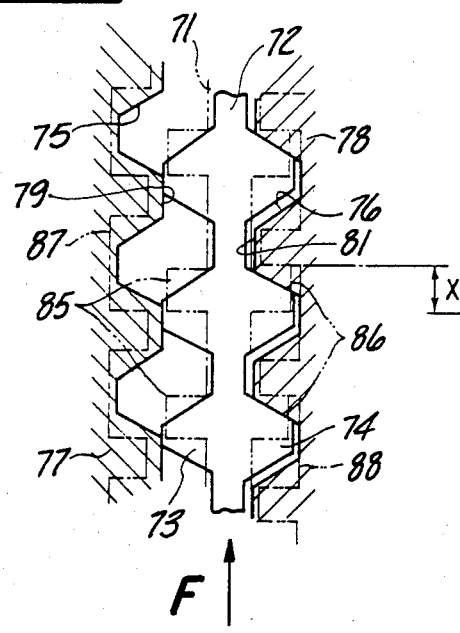
FIG. 6 is a partially schematic cross-sectional view showing the operation of the locking device associated with the final drive when in a forward driving mode.
Figure 7:
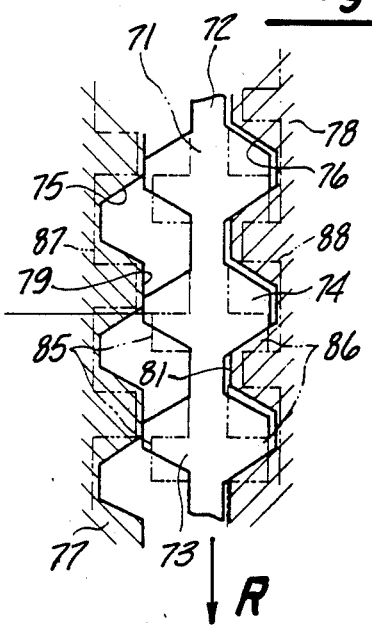
FIG. 7 is a view, in part similar to FIG. 6, showing the operation in the reverse drive mode.

The pinion gear 65 is in mesh with a ring gear 68 that is contained within the housing 59 and is journaled by an anti-friction bearing 69 within this housing. The ring gear 68 is suitably fixed through for rotation with an intermediate member 71 that has a lost motion connection (not shown) with an internal cam ring 72 which, as best shown in FIGS. 6 and 7, has oppositely facing driving lugs 73 and 74. The lugs 73 and 74 are adapted to be received in corresponding shaped recesses 75 and 76, respectively, of a pair of driven collars 77 and 78. The collars 77 and 78 have, in turn, flattened surfaces 79 and 81 that are adapted at times to pass over respective flats formed on the lugs 73 and 74 of the cam ring 72 for a reason to be described.

The collar 77 has a splined engagement with the internal end of a first axle shaft 82 to which one of the rear wheels 32 is affixed in a suitable manner. The splined engagement permits axial movement of the collar 77 relative to the axle shaft 82. In a similar manner, the collar 78 has a splined connection to a second axle shaft 83 that carries the remaining rear wheel 32. Again, axial movement is permitted between the collar 78 and the axle shaft 83. Respective coil compression springs 84 act between the ends of the axle shafts 82 and 83 and the collars 77 and 78 so as to urge the collars 77 and 78 axially inwardly so that their respective recesses 75 and 76 will receive the lugs 73 and 74 of the cam ring 72.

The intermediate member 71 has driving lugs 85 and 86 that extend into larger complementary shaped recesses 87 and 88 of the sleeves 77 and 78. The lugs 85 and 86 and recesses 87 and 88 have square sides or flat driving faces while the lugs 73 and 74 and their complementary recesses 75 and 76 have inclined faces in the direction of driving force.

An axle extension housing 89 is affixed to the final drive housing 59 and encircles a portion of the axle shaft 82 for supporting it. This extension is carried by the frame tube 29 by means including a bracket 91. In a similar manner, the housing piece 62 of the final drive housing 59 has an axle extension 92 that encircles and supports the axle shaft 83. This extension 92 is supported by the frame tube 29 by means including a bracket 93.

The cooperation of the cam ring 72 and intermediate member 71 with the collars 77 and 78 operates to provide a differential type operation. For example, if driving in a forward direction F (FIG. 6) and rounding a curve to the right, the left hand wheel 32 will tend to rotate faster than the wheel 32 at the right hand side. This is permitted since the collar 77 may move axially against the action of the spring 84 so as to cause the cam lugs 73 to move out of the recesses 75 and pass the flats 79. The collar 78 is, however, maintained in engagement so that the driving forces will be delivered predominantly through the right hand side wheel through lugs 74 and 86 and recesses 76 and 88. The inclination of the lug surfaces 73 and recess surfaces 75 will assist in this camming operation for effecting the axial movement of the sleeve 77. Since the lugs 85 are substantially narrower in the driving direction than the recesses 87, there may be lost motion occur during this axial movement. However, the lugs 74 and 86 and specifically the latter's cooperation with their respective recesses 76 and 88 will insure good driving force. As seem in FIG. 6, the lost motion connection permits the lugs 86 to move into engagement with the recesses 88 so as to provide a full face driving relationship.

In a similar manner, if travelling in reverse as indicated by the arrow R in FIG. 7, and turning in the same direction, the wheel 23 at the outside may overrun due again to compression of the spring 84 and movement of the collar 77 out of engagement with the cam ring 72 and intermediate member 71. Differential action when turning in the other direction is believed to be readily apparent.

A brake assembly is incorporated for halting the rotation of the vehicle 21 and specifically the axle shafts 82 and 83. This braking assembly includes the brake rotor 55 and is shown in most detail in FIGS. 4, 5 and 8, although the braking mechanism also appears generally in FIGS. 1 through 3.

Referring now specifically to these figures, the brake casing 53 is provided with a pair of aligned, cylindrical openings 95 and 96, which are formed respectively in the casing portions 49 and 51 and which have their axes extending parallel to the axis of rotation of the drive shaft 45 and which openings are generally aligned with the opposing surfaces of the brake rotor 55. A first brake pad 97 is positioned with its backing plate in sliding engagement with the opening 95 and with its lining adapted to engage the brake rotor 55. The brake pad 97 is held against axial movement and the opening 95 is closed by means of a closure plug 98 that is affixed to the casing 53 and specifically its portion 49 by means of a plurality of threaded fasteners 99.

In a similar manner, a brake pad 101 is disposed in the opening 96 and has its backing plate slidably engaged with the opening 96 so as to hold it against radial movement. A cover plate, indicated generally by the reference numeral 102, is affixed across and encloses the opening 96 by means of threaded fasteners 103. An arrangement is provided for actuating the brake pad 101 into engagement with the brake rotor 55 and for urging the brake rotor 55 axially along the splines 57 into engagement with the brake pad 97. This actuating mechanism includes an actuating pad 104 that is carried by a shaft 105 that is received within a bore in an externally threaded actuating shaft 106 and which pad is abuttingly engaged with the end of the shaft 106. The shaft 106 has its external threads engaged with internal threads formed on the cover plate 102 so that rotation of the shaft 106 relative to the cover 102 will effect axial movement of the shaft 106, actuating pad 104 and brake pad 101. For this purpose, a lever 107 is affixed to the exposed end of the shaft 106 in an appropriate manner.

Figure 4:
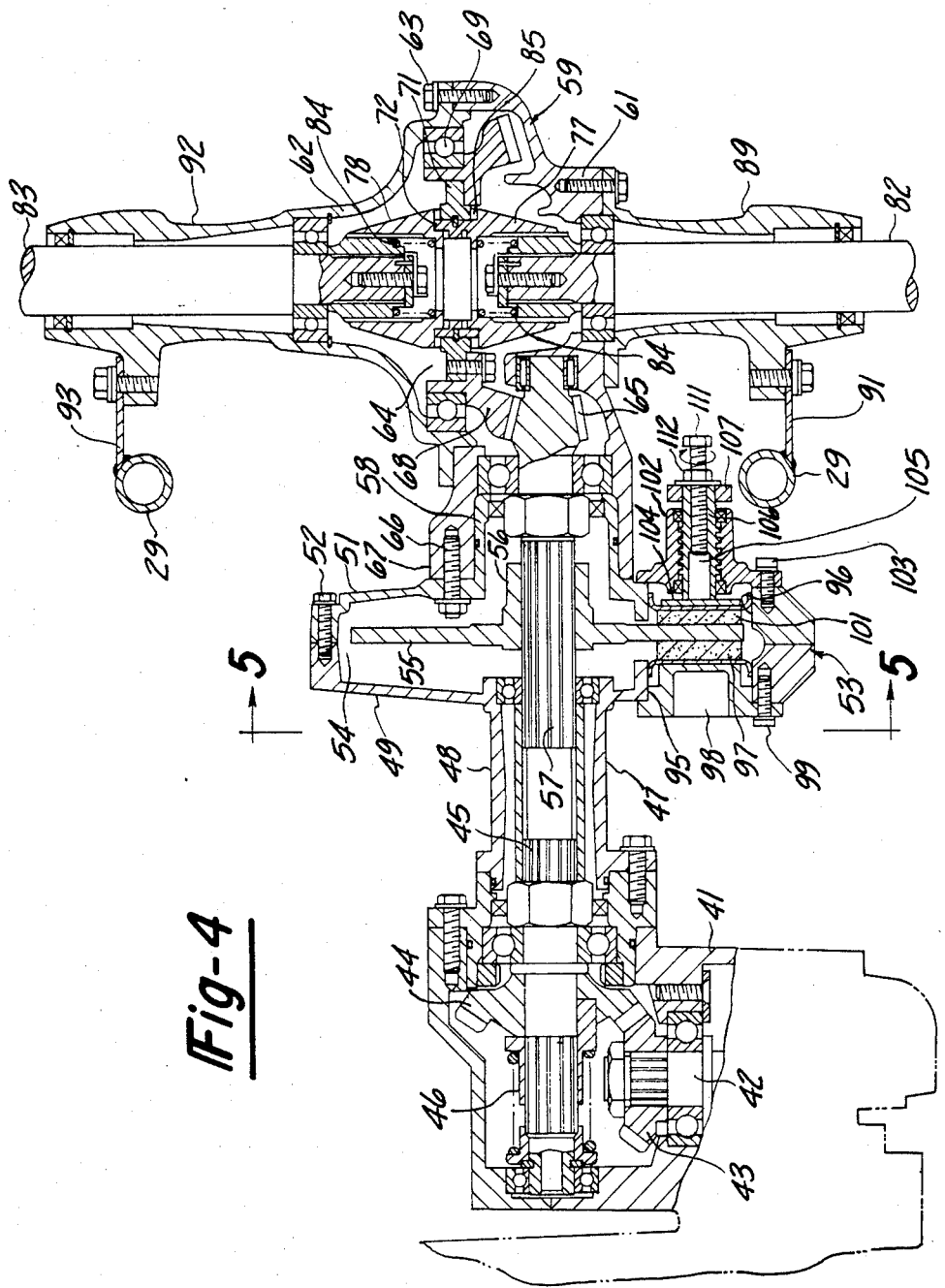
FIG. 4 is an enlarged cross-sectional view taken generally along the line 4—4 in FIG. 1, showing the final drive and braking arrangement.
Figure 5:
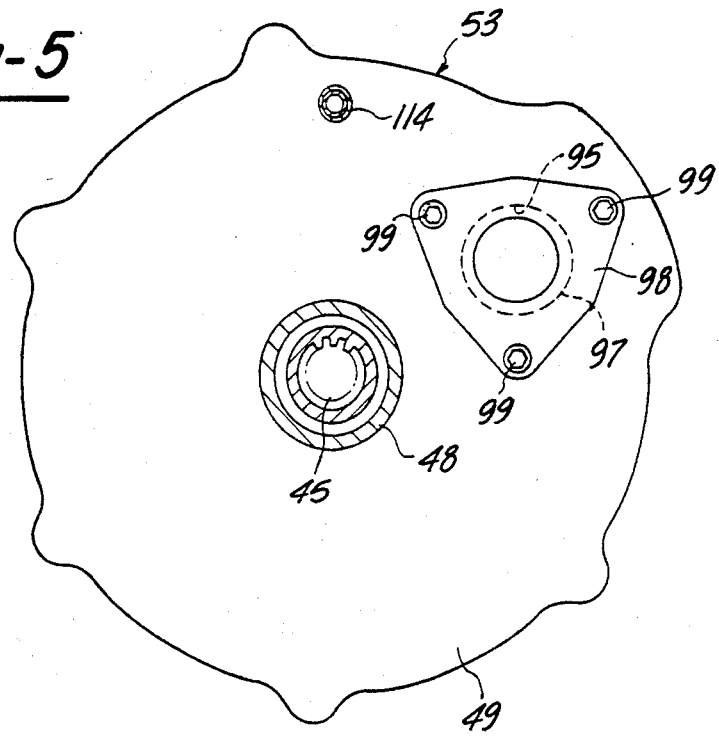
FIG. 5 is a cross-sectional view taken along the line 5—5 of FIG. 4.

The lever 107 is connected to the Bowden wire of a Bowden wire actuator 108 (FIGS. 2 and 3). The opposite end of the wire actuator of the Bowden wire 108 is connected to a brake actuating pedal 109 that is supported by the vehicle frame 22 in proximity to one of the foot pegs 38. Actuation of the brake pedal 109 tensions the wire actuator of the Bowden wire 108 and will rotate the lever 107 and actuating shaft 106 in the direction of the arrow shown in FIG. 4. The hand of the threads on the actuating shaft 106 and cover 102 are such that this rotation will effect axial movement of the shaft 106, actuating pad 104 and brake pad 101 to the left as seen in FIG. 4. This will bring the brake pad 101 into engagement with the brake disk 55 and move the brake disk 55 axially along the splines 57 into engagement with the brake pad 97 for effecting braking of the brake rotor 55, drive shaft 45 and axle shafts 82 and 83. A suitable return spring is provided so as to release the brakes when the brake pedal 109 is not activated.

An arrangement is also provided for adjusting for the wear of the friction linings of the brake pad 97 and 101. This includes an adjusting screw 111 that is threaded into the actuating sleeve 106 and which engages the pin 105 so as to move it, the actuating pad 104 and the brake pad 101 axially relative to the housing assembly 53. This axial movement will also effect axial movement of the brake rotor 55 so as to bring it closer to the brake pad 97 upon its wear. The screw 111 is locked in its adjusted position by means of a jam nut 112.

It should be readily apparent that the described construction permits enclosure of the brake rotor 55 and yet provides for convenient replacement of the brake pads 97 and 101 by removal of the covers 98 and 102. Thus, the device operates in a highly effective manner, protects the brake components from damage due to the off the road use and, furthermore, provides for easy servicing.

As is well known, a brake operates to stop the rotational force and convert the energy into heat. Because the brake rotor or disk 55 is contained within the casing 53 as are the brake pads 97 and 101, this heat cannot be readily dissipated. In accordance with an embodiment of the invention, the heat may be dissipated through an arrangement as shown best in FIG. 8. For this purpose, the casing assembly 53 is provided at its upper portion with a nipple 113. A flexible conduit 114 connects the nipple and, accordingly, the interior of the casing 53 with an air cleaner 115 of the induction system of the engine 39. For a reason to be described, the connection to the air cleaner 115 is on the upstream or dirty side of the air filter element that is contained within the air cleaner 115 but which does appear in the drawings.

Since when the engine 39 is running, the air cleaner 115 will be at slightly less than atmospheric pressure, a pressure differential will be generated within the casing cavity 54 that will cause air to leak in and be drawn across the brake rotor surface 55 and discharged into the air cleaner 115 through the nipple 113 and conduit 114. This will effect cooling of the brake assembly. In addition, the frictional linings from the pads 97 and 101 that wear off will be drawn into the air cleaner and trapped by the air filter element so as to prevent their accumulation within the casing 54. If there is any reverse flow of air to the casing 54 from the air cleaner assembly 115, there will be no foreign material delivered to the brake components because the air inlet for the air cleaner 115 is positioned in a protected place wherein foreign material cannot be drawn into the air cleaner. For example, the inlet to the air cleaner may be disposed as shown in U.S. Pat. No. 4,496,019, issued Jan. 29, 1985 and assigned to the assignee of this application.

EMBODIMENT OF FIGS. 9 AND 10

In the embodiment of FIGS. 1 through 8, the disk brake assembly was completely contained within a protective housing assembly and the brake pads were associated with openings in this housing assembly so as to facilitate their servicing. As a result of the complete containment, it is desirable to provide some arrangement for cooling the brakes and such an arrangement has been illustrated and described in conjunction with the construction shown in FIG. 8. In some instances, it may be possible to provide a housing assembly that does not completely enclose the brake but which will nevertheless give the aforenoted advantages.

Figure 10:
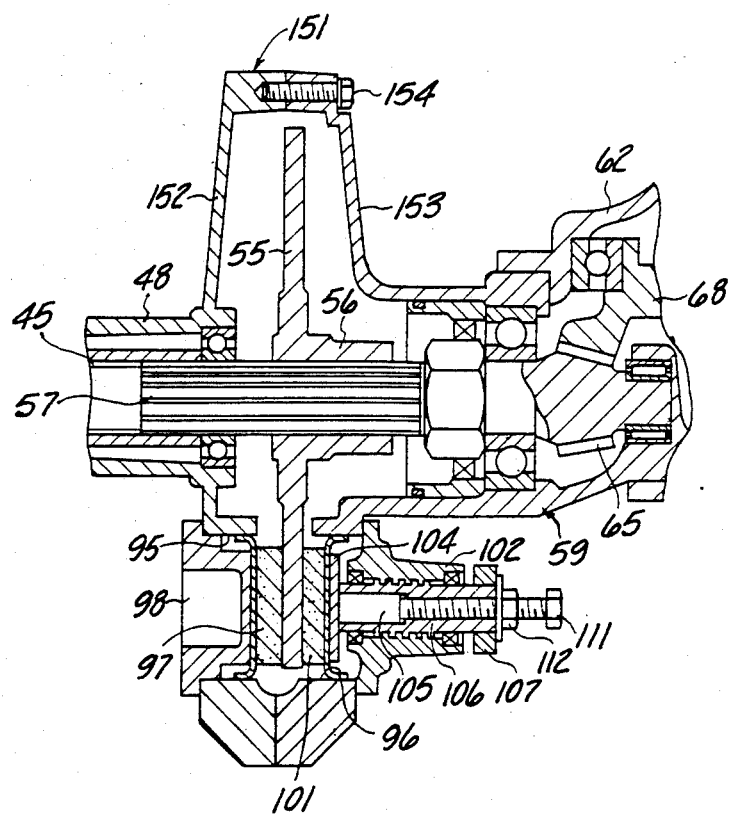
FIG. 10 is a cross-sectional view taken through the embodiment of FIG. 9.
Figure 11:
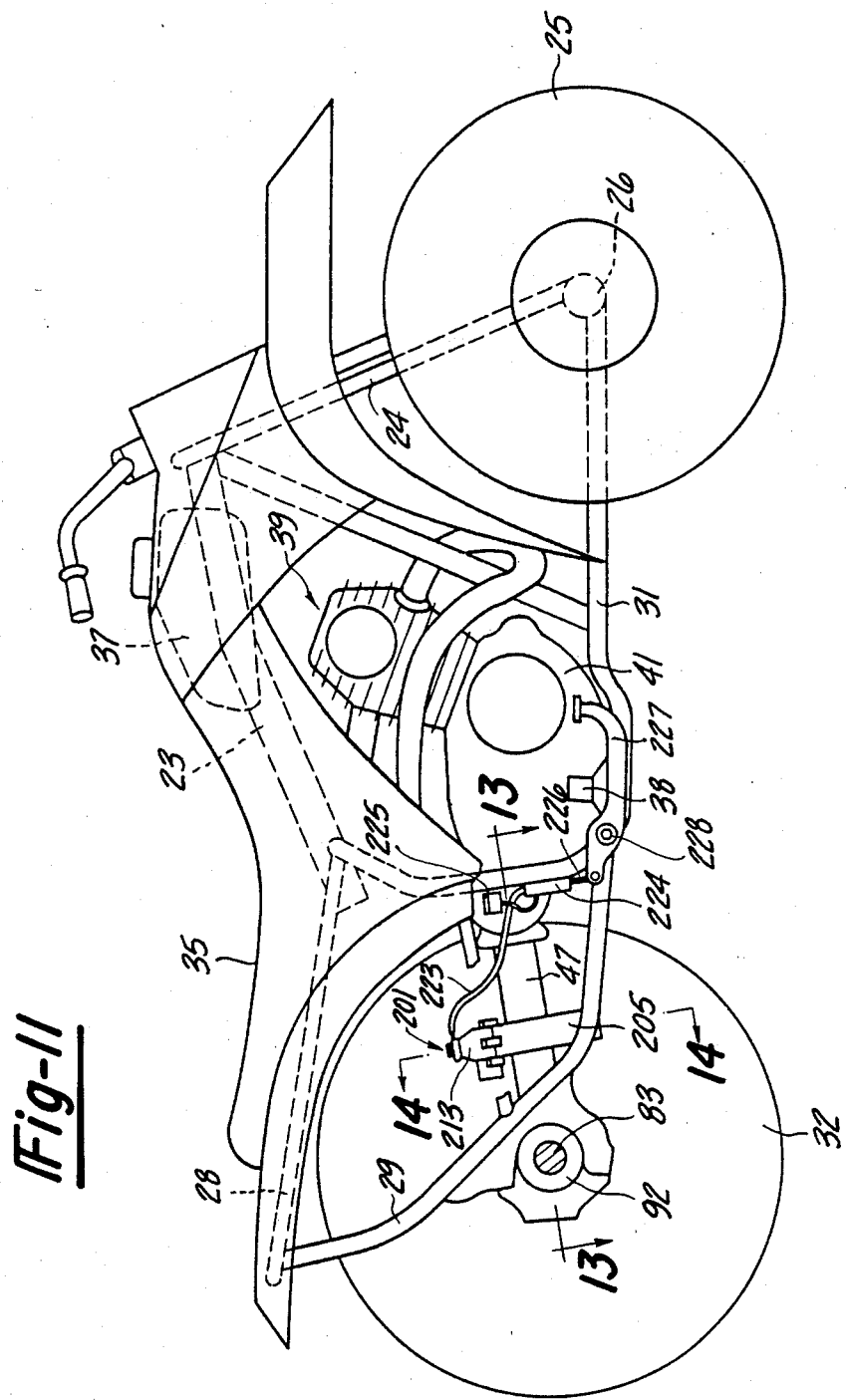
FIG. 11 is a side elevational view, in part similar to FIG. 1, showing a further embodiment of the invention.
Figure 12:
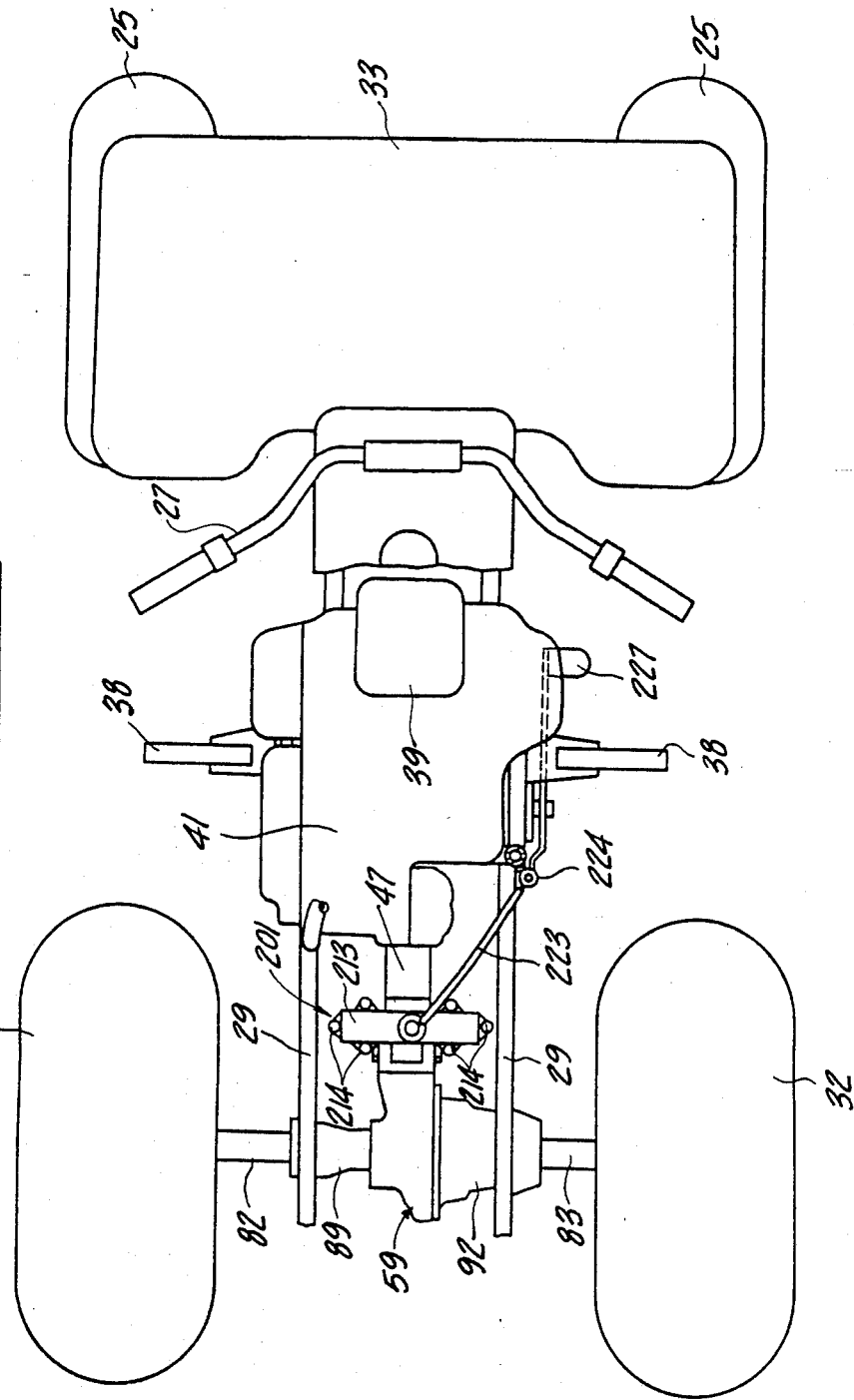
FIG. 12 is a top plan view of the embodiment shown in FIG. 11 with certain of the components removed to more clearly show the construction.
Figure 13:
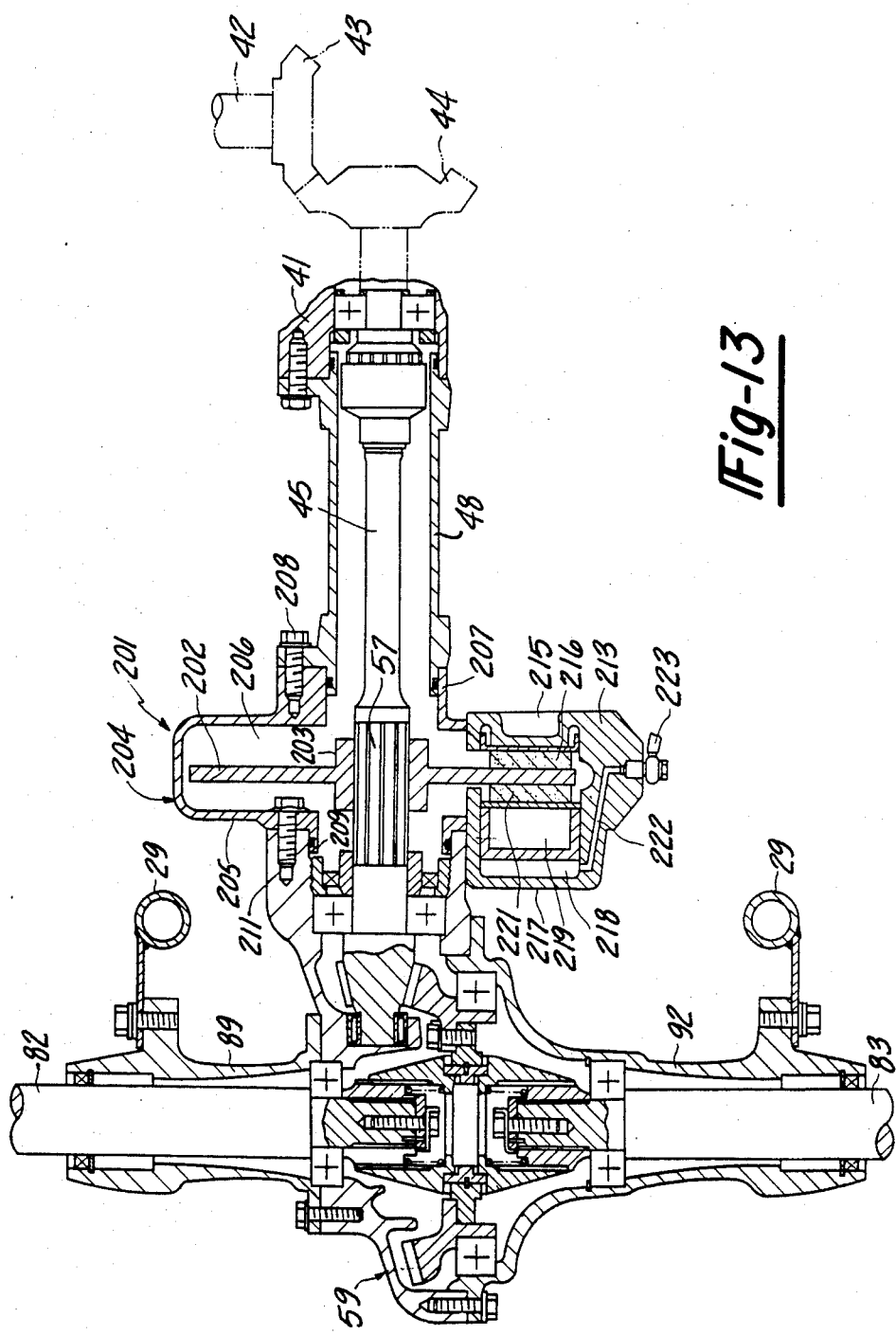
FIG. 13 is an enlarged cross-sectional view taken along the line 13—13 of FIG. 11.
Figure 14:
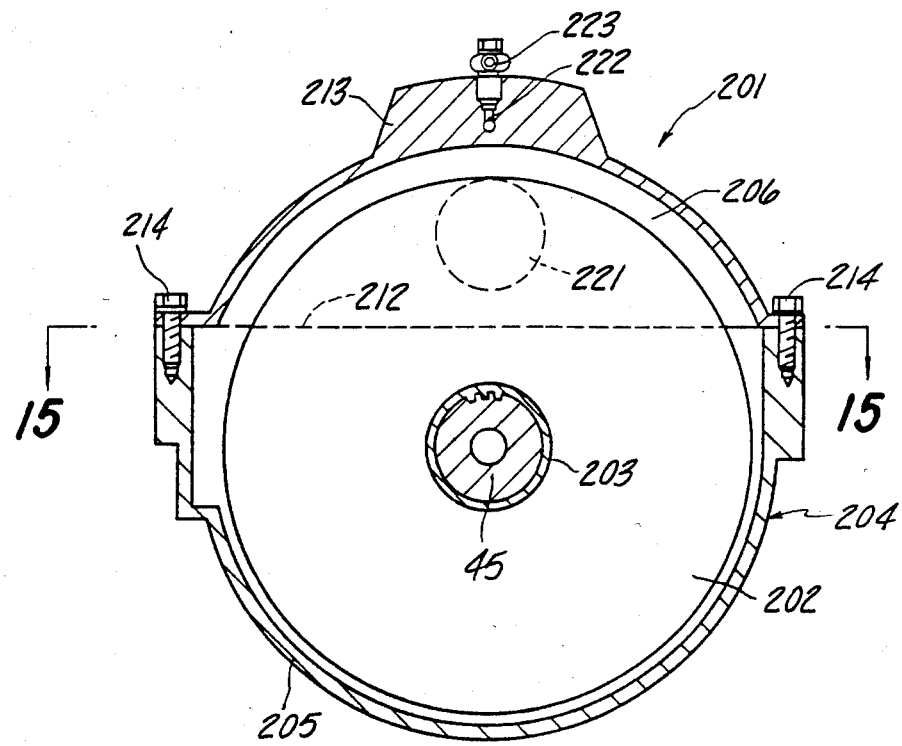
FIG. 14 is an enlarged cross-sectional view taken along the line 14—14 of FIG. 11.
Figure 15:
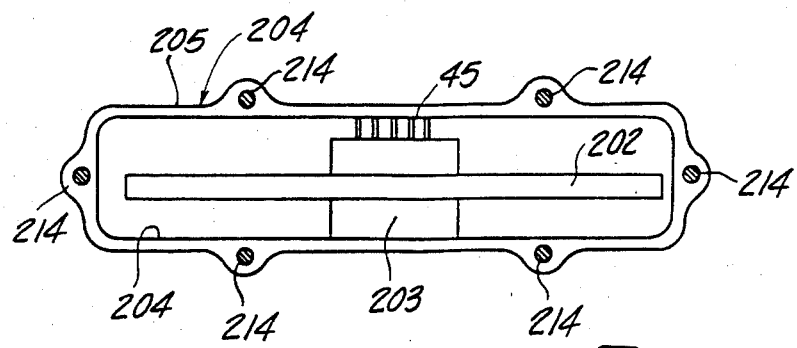
FIG. 15 is a cross-sectional view taken along the line 15—15 of FIG. 15.

In FIGS. 9 and 10, only the brake and its associated casing have been illustrated and those components which are the same as the previously described embodiment have been identified by the same reference numeral. These elements will not be described again, except insofar as is necessary to understand the construction and operation of this embodiment.

In this embodiment, the brake rotor 55 is surrounded by a housing assembly 151 that is comprised of a first piece 152 and a second piece 153 that are connected together around their periphery by means of a plurality of threaded fasteners 154. As with the previously described embodiments, the pieces 152 and 153 have respective openings 95 and 96 in which brake pads 97 and 101 are respectively supported. The opening 95 is closed by a closure plug 98 while the opening 96 is closed by a plug 102 that carries the actuator for the brake as in the previously described embodiment.

In this embodiment, the housing 151 does not fully enclose the brake disk 55 but rather is provided with a plurality of generally pie-shaped openings 155 that are angularly related and which may have any desired width and number. The openings 155 are preferably disposed, however, so that the part of the brake assembly that might be damaged by encounter with obstacles over which the vehicle is operated will be protected by the housing 151. Said another way, the openings 155 are positioned in areas that are otherwise protected by the body or structural members of the vehicle.

Because of the opened construction performed by the cutouts 155, the extra cooling arrangement of the previously described embodiment is not necessary. However, the advantages of that embodiment with respect to the mounting and operation of the brake pads are common with this device.

EMBODIMENT OF FIGS. 11 THROUGH 15

Another embodiment of the invention is shown in FIGS. 11 through 15. This embodiment differs from the previously described embodiments only in the construction of the brake assembly and, for that reason, other components of the vehicle which are the same as the previously described embodiments have been identified by the same reference numerals and will not be described again, except insofar as is necessary to understand the construction and operation of this embodiment.

In the two embodiments of the invention previously described, the disk brake assembly associated with the drive shaft 45 was mechanically actuated. In accordance with this embodiment, a hydraulically operated disk brake assembly, indicated generally by the reference numeral 201, is associated with the drive shaft 45 for braking its rotation. The disk brake assembly 201 includes a brake rotor or disk 202 that has a hub 203 which is internally splined and is non-rotatably coupled but axially movable relative to the splines 57 of the drive shaft 45 as in the previously described embodiments. The disk 202 is completely enclosed within a housing assembly, indicated generally by the reference numeral 204. In this embodiment, the housing assembly 204 is made of a single piece 205 that defines an internal cavity 206 in which the brake disk 202 rotates. The housing 204 has a first flange portion 207 with tapped openings that receive threaded fasteners 208 so as to affix the tubular casing 48 to the casing 204. At the opposite side, the housing 204 is provided with a further flange 209 through which threaded fasteners 211 pass so as to affix the housing 204 to the final drive casing 59.

The upper end of the housing 204 is cut off along a line 212 so as to provide an area wherein the upper portion of the brake rotor 202 is exposed. This opening is closed by a caliper housing 213 that is affixed to the casing 204 by means of a plurality of threaded fasteners 214 that are threaded into tapped openings formed in the surface 212 of the casing 204.

The caliper 213 has a first leg 215 that is formed with a recess so as to receive a flanged backing plate of a first brake pad 216. The brake pad 216 is affixed relative to the caliper 213 by means of this relationship. On the other side of the rotor 204, the caliper 213 is provided with a second leg 217 that is integrally connected with the leg 215 and which defines a bore 218 in which a hydraulically actuated piston 219 is slidably supported. The piston 219 engages the backing plate of a second brake pad 221 which is also slidably supported within the bore 218.

The bore 218 is adapted to be selectively pressurized through an internal passage 222 formed in the bridge portion of the caliper 213 and to which one end of a hydraulic line 223 is connected. The opposite end of the hydraulic line 223 extends to a master cylinder assembly 224 that is carried by the frame assembly 22. A reservoir 225 is juxtaposed to the master cylinder 224 so as to provide a source of hydraulic fluid to make up for the fluid displaced due to wear of the brake linings of the pads 216 and 221. The master cylinder 224 has an actuating plunger 226 that is engaged with one end of a brake pedal 227 that is pivotally supported on the frame by a pivot pin 228 and which pedal is juxtaposed to one of the foot pegs 38 so as to permit convenient operator actuation.

The brake of this embodiment operates by having the operator depress the brake pedal 227 which actuates the master cylinder 224 to pressurize the line 223. This pressure is transmitted through the internal line 222 of the caliper to the cylinder bore 218 so as to actuate the piston 219 and move the brake pad 222 into frictional engagement with the brake rotor 202. The brake rotor 202 will then move axially along the drive shaft splines 57 so that it will be forced into engagement with the brake pad 216 and rotation of the drive shaft 45 will be braked. The release operation is believed to be apparent.

In connection with this embodiment, the brake pads 216 and 221 may be conveniently serviced by removing the fasteners 214 and the caliper 213 so as to offer access to the brake pads so that they can be released. As with the embodiment of FIGS. 1 through 8, if desired, the interior cavity 206 of the casing 204 may be vented to the air cleaner of the engine induction system. Alternatively, the housing 204 may be provided with appropriately spaced cutouts as with the embodiment of FIGS. 9 and 10.

It should be readily apparent from the foregoing description that a highly effective arrangement has been provided for insuring protection of the components of the disk brake while affording easy replacement and servicing. Although three embodiments of the invention have been illustrated and described, various changes and modifications may be made without departing from the spirit and scope of the invention, as defined by the appended claims.

I claim:

1. A drive and braking arrangement for a wheeled vehicle having a pair of spaced apart wheels, axle means carrying said wheels, final drive means for driving said axle means and said wheels, an engine, a drive shaft driven by said engine for driving said final drive means for driving said wheels, a brake disk fixed for rotation with said drive shaft, a brake casing fixed relative to one of said engine and said final drive means and enclosing said brake disk, an opening formed in the brake casing aligned with a surface of the brake disk and extending in an axial direction parallel to the axis of rotation of said drive shaft, a brake pad slidably supported within said brake casing opening and axially movable relative thereto, and actuating means affixed to said brake casing and closing said opening, said brake pad being removable from said brake casing in an axial direction through said opening upon removal of said actuating means without removal of said brake casing from said vehicle.

2. A drive and braking arrangement as set forth in claim 1 wherein the actuating means comprises a mechanical actuator.

3. A driving and braking arrangement as set forth in claim 1 wherein the actuating means comprises a hydraulic actuator.

4. A driving and braking arrangement as set forth in claim 1, wherein the actuating means comprises a caliper.

5. A driving and braking arrangement as set forth in claim 4 wherein the caliper is affixed against movement relative to the brake casing.

6. A driving and braking arrangement as set forth in claim 5 wherein there are a pair of brake pads carried by the caliper, one fixed relative to the caliper and another axially movable relative to the caliper and the actuating means being carried by the caliper for moving said movable brake pad into engagement with the brake rotor and said rotor relative to the drive shaft.

7. A driving and braking arrangement as set forth in claim 1 wherein the casing is provided with a plurality of pie-shaped openings.

8. A driving and braking arrangement for a wheeled vehicle having a pair of spaced apart wheels, axle means carrying said wheels, final drive means associated with said axle means for driving said wheels, an engine, a drive shaft driven by said engine and associated with said final drive means for driving said wheels, a brake disk fixed for rotation to said drive shaft, a brake casing fixed relative to one of said engine and said final drive means and enclosing said brake disk, an opening formed in the brake casing and aligned with a surface of the brake disk, a brake pad associated with the brake casing, said engine having an induction system comprising an air cleaner, and means for venting the interior of said casing into said air cleaner.

9. A driving and braking arrangement as set forth in claim 8 wherein the brake casing is vented into the air cleaner upstream of the air filter element.

* * * * *